T. J. MELL.
PROCESS OF MANUFACTURING TIRES AND APPARATUS THEREFOR.
APPLICATION FILED JAN. 27, 1919.
1,389,960. Patented Sept. 6, 1921.
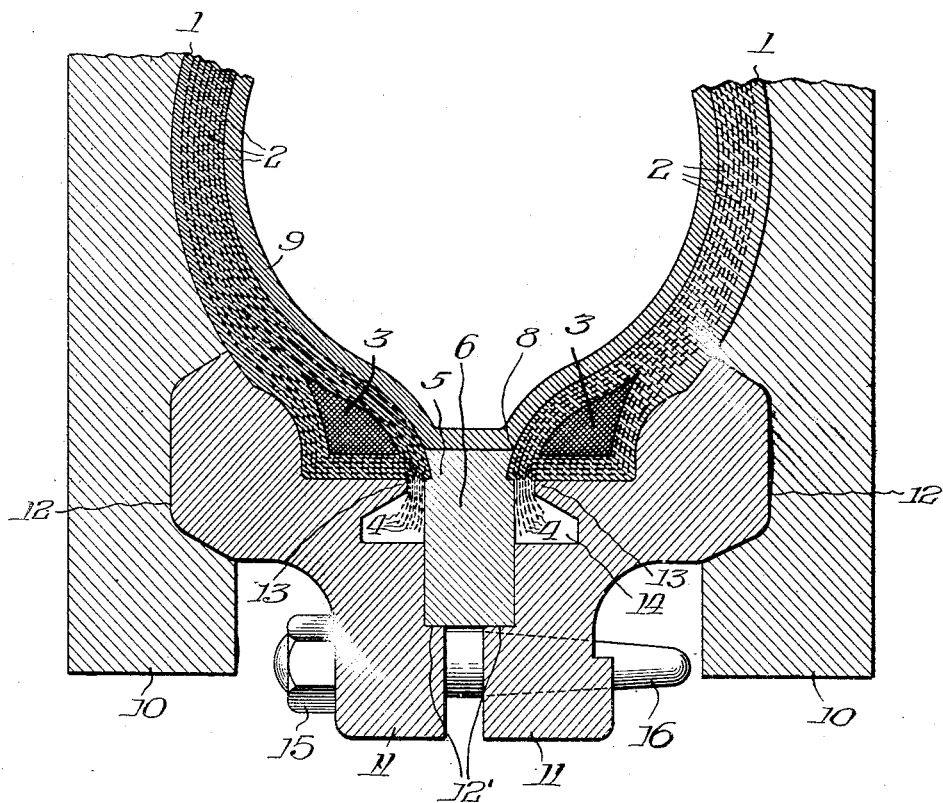

UNITED STATES PATENT OFFICE.

TOD J. MELL, OF AKRON, OHIO, ASSIGNOR TO THE FIRESTONE TIRE AND RUBBER COMPANY, OF AKRON, OHIO, A CORPORATION OF OHIO.

PROCESS OF MANUFACTURING TIRES AND APPARATUS THEREFOR.

1,389,960.     Specification of Letters Patent.     Patented Sept. 6, 1921.

Application filed January 27, 1919. Serial No. 273,209.

*To all whom it may concern:*

Be it known that I, TOD J. MELL, a citizen of the United States, residing at Akron, in the county of Summit and State of Ohio, have invented certain new and useful Improvements in Processes of Manufacturing Tires and Apparatus Therefor, of which the following is a specification.

In manufacturing tires of certain types, it is customary to construct the tire carcass from a plurality of layers, all, or most, of which meet at the lowermost point of the casing. It is necessary to trim the lower edges of the tire casing at the point of the bead, and it has been the practice to perform this operation as the last step in the tire building. Certain types of tires, particularly what are known as the "cord tire", are removed from the building core and in place of the building core there is inserted an expansible core or air bag which is intended to be inflated by fluid pressure to expand the fabric in the tire. The inflation of the expansible core is performed after the tire and air bag are inserted in the mold either before or after the assembled mold is placed in the vulcanizer. It is the common practice to place over the lower edges of the tire or beads, as they are termed, a pair of bead forming rings, which are forced together by any suitable means to exert an adequate forming pressure on this section of the tire, the beads being separated by an iron ring, termed a "bull ring", or by the inner edge of the air bag which is usually reinforced to receive the pressure of the rings.

It has been my observation, that when the expansible core is inflated to the pressure which is exerted upon it before or during the curing process, as the lower edges of the fabric layers have nothing to hold them in place, the expansion frequently causes them to slip so that the inside edges of the several layers will leave their appointed places and shift toward the tread of the tire. Because of this action on the part of the layers of fabric, their relationship is altered from that which they are intended to have, and the beneficial results of expansion are lost to a greater or less extent.

It is the purpose of my invention to remedy this defect in the manufacture of tires by the expansion method and it is done by anchoring or securing the inside edges of the several plies before the core is expanded. This is accomplished by allowing the inner edges of the plies to extend below the tire bead, and then clamping the plies by means of the molding elements. The simplest manner of accomplishing this result is by omitting to trim the rough, uneven edges of the fabric plies on the tire machine and by providing anchoring recesses in the bead forming rings so that when the air bag and ring are assembled prior to inflation, the edges of the plies are securely held and cannot slip when the pressure is applied. The rough edges are trimmed as one of the finishing operations after the vulcanization is completed.

In the drawings the single figure is a cross section of the tire, mold and expansible core assembled for vulcanization.

1, represents the tire composed of a plurality of plies of rubberized fabric 2 which may be canvas or cords, according to the type of tire which it is desired to build. The beads are indicated at 3 and, as shown in the drawing, are of the straight side variety. The untrimmed edges of the plies are shown at 4, the tire differing in this respect from a tire as ordinarily assembled for curing.

Between the lower edges of the tire casing is shown a center ring 5, the outer edge 6 of which extends between the beads and constitutes a "bull ring", although it differs from many of the "bull rings" in common use, which extend farther into the casing. At the point where the lower edge of the tire is located is arranged a recess 8 on each side of the ring by which a sharp well defined bead is insured.

Surmounting the ring is the expansible core 9 which may be made of any suitable material and is designed to be inflated by any suitable means, not shown. It has been proposed to expand tires for vulcanization by admitting the pressure fluid directly into the casing and this procedure may be followed in practising this invention.

Portions of both halves of the mold are indicated by the numerals 10, the cavity whereof is slightly larger than the outside of the tire as made on the building core. The bead forming and clamping rings are shown at 11, each ring being arranged to be positioned in seats 12 in the mold halves. On the facing surfaces of the bead rings is formed a chamfered seat 12' designed to register with the ring 5. The outer edges of the bead rings conform to the lower surfaces of the tire but terminate short of the ring 5, being formed with ribs 13 which have spaces on each side of the center ring in which the uneven edges of the plies of fabric are securely anchored. Below the point of anchorage the rings are hollowed out to form recesses 14.

Any suitable means may be provided for drawing together and clamping the two bead forming rings, that shown being a bolt and nut 15. Any suitable number of dowels 16 may be arranged about the rings to register them properly.

If desired, the bead forming rings may be made integral with the mold halves without affecting the invention in any way. Other changes and modifications may be made in the invention without departing from the spirit thereof or sacrificing any of its benefits.

I claim:

1. The process of manufacturing tire casings comprising the steps of forming the casing, leaving the untrimmed edges of the casing projecting below the beads, holding the untrimmed edges, and expanding the tire while the edges are held.

2. The process of manufacturing tire casings comprising the steps of forming the casing from a plurality of plies, leaving some of the plies untrimmed with their edges projecting below the beads, clamping the edges and expanding the tire while the edges are clamped.

3. The process of manufacturing tire casings comprising the steps of forming the casing from a plurality of plies, allowing the edges of the plies to project below the bead, anchoring the edges and expanding the tire by fluid pressure while the edges are anchored.

4. The process of manufacturing tire casings, comprising the steps of laying up a plurality of plies, allowing the edges of the plies to project beyond the edges of the casing, clamping the projecting edges of the plies, and bringing said casing to its final shape while the edges are clamped.

5. The process of manufacturing tire casings, comprising the steps of laying up a fabric casing with the fabric edges projecting beyond the edges of the casing, securing the edges, and expanding.

6. The process of manufacturing tire casings, comprising the steps of constructing a fabric casing, without trimming, securing the untrimmed edges, vulcanizing and trimming.

7. The process of manufacturing tire casings, comprising the steps of constructing a casing from a plurality of plies that project below the bead, holding the untrimmed edges, expanding the casing, vulcanizing and trimming.

8. The process of manufacturing tire casings, comprising the steps of constructing a tire on a core of a given size from a plurality of plies, allowing the edges of the plies to project from the beads, securing the projecting edges of the plies, expanding the tire to a larger size while the edges are secured, and vulcanizing.

9. In an apparatus of the character described, a mold comprising a pair of molding elements to receive a tire casing, a clamping element located centrally of the mold and a formation on the mold elements adapted to coöperate with the clamping element to secure untrimmed edges of the tire casing.

10. In an apparatus of the character described, a mold comprising a pair of molding elements to receive a tire casing, a clamping ring located between the elements, a formation on the mold elements adapted to coöperate with the clamping ring to secure untrimmed edges of the tire casing, and means to expand the tire in the mold.

11. In an apparatus of the character described, a mold, a pair of bead forming rings in said mold and a clamping ring between the two bead forming rings, the edges of the bead forming rings and the clamping ring being so related as to leave a space in which the untrimmed edges of the carcass are received.

12. In an apparatus of the character described, a mold, a pair of bead forming rings in said mold, a clamping ring between the two bead forming rings, the edges of the bead forming rings and the clamping rings being so related as to leave a space in which the untrimmed edges of the carcass are received, and means to expand the tire.

13. An apparatus of the character described, comprising a pair of bead forming rings, a central clamping member between the rings, the said rings and member being so formed adjacent the points of the beads as to provide spaces to receive the untrimmed edges of the carcass, and means to clamp the rings and the clamping member together.

14. In an apparatus of the character described, comprising a pair of bead forming rings, a central clamping member between the rings, the said rings and member being so formed adjacent the points of the beads as to provide spaces to receive the untrimmed edges of the carcass, means to clamp the rings and the clamping member together, and means to expand the tire.

15. In an apparatus of the character described, a mold, a pair of bead forming rings in said mold, a clamping ring between the two bead forming rings, the edges of the bead forming rings and the clamping ring being so related as to leave a space in which the untrimmed edges of the carcass are received, and an expansible core on said clamping ring.

16. An apparatus of the character described, comprising a pair of bead forming rings, a central clamping member between the rings, the said rings and member being so formed adjacent the points of the beads as to provide spaces to receive the untrimmed edges of the carcass, means to clamp the rings and the clamping member together, and an expansible core on said clamping ring.

TOD J. MELL.